008b# United States Patent [19]
Katayama et al.

[11] 3,843,752
[45] Oct. 22, 1974

[54] BLOCK COPOLYMERS HAVING A POLYHYDROCARGON-POLYESTER MAIN CHAIN

[75] Inventors: Shitomi Katayama; Hideichi Horikawa, both of Akita; Noboru Masuda, Kawaguchi, all of Japan

[73] Assignee: Denki Onkyo Co., Ltd., Tokyo, Japan

[22] Filed: Apr. 13, 1972

[21] Appl. No.: 243,826

[30] Foreign Application Priority Data
Apr. 13, 1971  Japan.............................. 46-23348

[52] U.S. Cl. ............................................. 260/873
[51] Int. Cl. ......................................... C08g 39/10
[58] Field of Search ...... 260/873, 75 R, 75 A, 75 T, 260/897

[56] References Cited
FOREIGN PATENTS OR APPLICATIONS
1,262,792   2/1972   Great Britain

*Primary Examiner* — Melvin Goldstein
*Assistant Examiner* — T. Pertilla
*Attorney, Agent, or Firm* — Armstrong, Nikaido & Wegner

[57] ABSTRACT

This invention provides block copolymers containing ester linkages and polymerized units of ethylenically unsaturated monomers and a process for their preparation. The process is characterized by polymerizing an ethylenically unsaturated monomer in the presence of Lewis Acid and an acid polyhalide to give a $\omega,\omega'$-dihalopolymer, which is then converted by hydrolysis into $\omega,\omega'$-dihydroxypolymer, which is, directly or indirectly in the form of its ester, polymerized with a polycondensable monomer such as a diol, and its ester; dicarboxylic acid, its ester, its halide; hydroxy carboxylic acid, and its ester, to give the block copolymer. The new polymers are useful for applications in which polyesters of special properties are required. These new polymers are useful for many practical applications, since they can be cast or spun into films, fibers, plastics, etc., depending upon their compositions and types of monomer. For example, polystyrene ethylene terephthalate can be used as a plastic in a richer composition of styrene units, and as a fiber or as a film in a richer composition of ethylene terephthalate units.

16 Claims, No Drawings

BLOCK COPOLYMERS HAVING A POLYHYDROCARGON-POLYESTER MAIN CHAIN

BACKGROUND OF THE INVENTION

Polyesters, such as polyethylene terephthalate, are very different in characteristics and properties from polymers of ethylenically unsaturated monomers, such as polystyrene. The former class of polymers are hydrolyzable and weaker against chemical reagents, including acids and bases, due to the ester linkages in the molecular main chains, while the latter polymers are stronger in this respect. The latter polymers are usually more elastic and plastic in nature and thus can be more easily molded and melt-cast into films and shaped objects. Some of the former polymers, especially aromatic polyesters, have higher melting points, Young's modulus, resistivity against solvents and higher crystallinity. Other polyesters, especially aliphatic polyesters, have far lower melting points than those of the polymers of ethylenically unsaturated monomers.

Thus, these two series of polymers have different merits and weak points. This invention provides new block copolymers which consist of polymer units of ethylenically unsaturated monomers and polyester units, thus combining the better properties of both series of polymers.

SUMMARY OF THE INVENTION

The polymers of the invention are characterized by a plurality of repeating units of the formula:

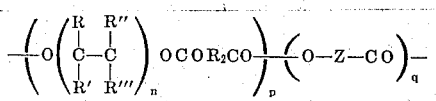

in which:
R, R', R'' and R''' are independently H or a member selected from the group consisting of alkyl radicals having up to 8 carbon atoms, aralkyl radicals having up to 10 carbon atoms, aryl radicals having up to 10 carbon atoms, alkoxy radicals having up to 8 carbon atoms;

R, R', R'' and R''' also collectively represent a 3–7 atom residue of a carbon ring structure which may contain up to two hetero oxygen atoms;

$R_2$ is a member selected from the group consisting of alkylene radicals having from 2–12 carbon atoms and arylene radicals having from 6–12 carbon atoms;

Z is a member selected from the group consisting of $-R_1OCOR_2-$ and $R_4$;

$R_1$ is an alkylene radical having from 2–12 carbon atoms;

$R_4$ is a member selected from the group consisting of 2–16 carbon atoms and arylene radicals having from 6 to 12 carbon atoms.

$n$ is an integer having a value of from 1 to 500; and $p$ and $q$ represent the relative molar ratio of each unit and are defined by the formula $(p/[p+q])+(q/[p+q])=1$.

The polymers of the invention are made according to the following series of equations in which R, R', R'', R''', $R_1$, $R_2$, $R_4$, $n$, $p$, and $q$ have the values given above. M is a metal; X is a halogen having a molecular weight of at least 35.5, $w$ and $y$ are integers having a value of 2–5, $z$ is 1 or 2, and A is the residue of an acid halide, and $R_3$ is hydrogen or an alkyl radical having up to 6 carbon atoms. Z is a member selected from the group consisting of $-R_1OCOR_2-$ and $R_4$; $R_1$ is an alkylene radical having from 2–12 carbon atoms; $R_4$ is a member selected from the group consisting of alkylene radicals having from 5–16 carbon atoms and arylene radicals having from 6–12 carbon atoms; $n$ is an integer having a value of from 1 to 500; and $p$ and $q$ are defined by the formula $(p/[p+q])+(q/[p+q])=1$.

(1) 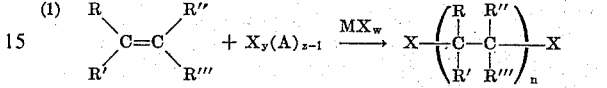

(2) 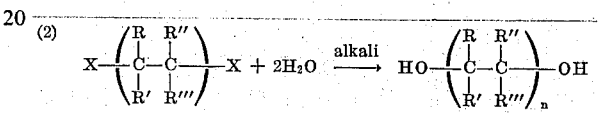

(3) 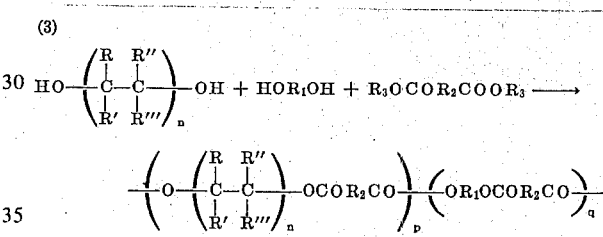

(3') 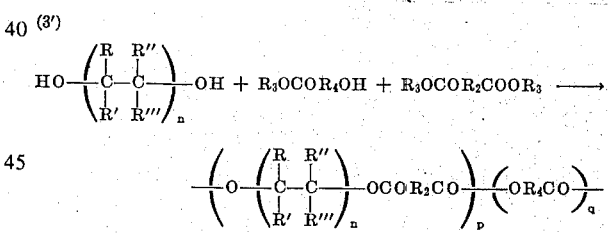

DETAILED DESCRIPTION

The copolymers of this invention are made by a process comprising three important steps. In the first step an ethylenically unsaturated monomer is polymerized in the presence of a Lewis acid and an acid polyhalide to produce a $\omega,\omega'$-dihalopolymer; in the second step this halopolymer is converted into a $\omega,\omega'$-dihydroxypolymer by hydrolysis; and in the last step the dihydroxypolymer or its ester is polymerized with a polycondensable monomer to produce a block copolymer.

Useful ethylenically unsaturated monomers are those which can polymerize cationically, such as ethylene, propylene, isobutylene, styrene, $\alpha$-methyl styrene, nuclear substituted styrenes, nuclear substituted $\alpha$-methyl styrenes, vinylmethyl ether, $\alpha,\beta$-dimethoxyethylene, vinylphenyl ether, stilbene, vinyloctyl ether, acenaphthylene, and the like.

Suitable Lewis acids are those which initiate cationic polymerization, such as beryllium dichloride, cadmium dichloride, zinc dichloride, boron trichloride, boron tribromide, aluminium trichloride, aluminium tribromide, gallium trichloride, titanium tetrachloride, titanium tetrabromide, zirconium tetrachloride, stannous chloride, stannic chloride, stannic bromide, antimony pentachloride, antimony trichloride, bismuth trichloride, ferric chloride, vanadium tetrachloride, and the like. Generally a catalytic amount of Lewis acid ranges between 0.01 to 10 mole percent based upon the number of moles of starting monomer.

Useful acid polyhalides are those commonly used for halogenation, including thionyl chloride, phosgene, phosphorus pentachloride, phosphorus trichloride, phosphorus oxychloride, and phosphorus tribromide. Chlorine, bromine and iodine can be also used as the halogenating reagent. Thus, the acid polyhalide contains two or more halogen atoms in the molecule. Among the molecular halogens, fluorine is not effective. Polymerization in this step is carried out by cationic polymerization techniques using a catalytic amount of the Lewis acid as a catalyst and the acid polyhalide as a halogenating reagent and cocatalyst.

Although not critical, the temperature for the polymerization is generally maintained between −100°C and +75°C, in order to obtain the $\omega,\omega'$-dihalopolymer in high yield and high degree of polymerization with the absence of appreciable side reactions.

The polymerization can be performed either in the absence of solvent in the presence of a solvent which is suitable for cationic polymerization, such as cyclohexene, bromobenzene, dichloroethylene, nitromethane, nitrobenzene, chlorobenzene, dichlorobenzene, carbon disulfide, ethyl chloride, carbon tetrachloride, hexane, chloroform, benzene, tetrachloroethane, and the like.

In the second step, the $\omega,\omega'$-dihalopolymer thus obtained is subjected to hydrolysis to give the $\omega,\omega'$-dihydroxypolymer. Suitable methods of hydrolysis are as follows:

1. The $\omega,\omega'$-dihalopolymer is hydrolyzed with water or with aqueous alkali metal or alkalene earth metal hydroxides such as sodium hydroxide, potassium hydroxide and calcium hydroxide, or with an alkali metal carbonate such as sodium carbonate or potassium carbonate.

This method is a direct method of forming hydroxyl groups, but the following indirect method can be also used.

2. The $\omega,\omega'$-dihalopolymer is either heater with silver acetate or with lead acetate in an acetic acid solution or heated with sodium acetate or sodium formate in a methanol solution or ethanol solution, to give a $\omega,\omega'$-diacetoxypolymer, which is then hydrolyzed with acid or alkali to give a $\omega,\omega'$-dihydroxypolymer.

In the above methods of hydrolysis, solvents which do not interfere with the hydrolysis or esterification may be added when either the $\omega,\omega'$-dihalopolymer or the resulting diacetoxypolymer or dihydroxypolymer is insoluble in water, alcohols, or acetic acid. The above reactions may be carried out not only in solution but also in dispersion. Hydrolyzable solvents such as amides, nitriles, esters, alkyl monohalides, alkyl dihalides should not be used. Suitable solvents include water; alcohols such as methanol, ethanol, propanol; alkyl halides such as chloroform, carbon tetrachloride; carboxylic acid such as acetic acid, propionic acid, butyric acid; hydrocarbons such as pentane, hexane, heptane, benzene, toluene, xylene, and any other that dissolve the polymers.

The use of organic solvents during hydrolysis is sometimes accompanied by a slight formation of double bonds at the ends of the polymer chains. This can be prevented by treating the polymer with either an aqueous suspension of lead monooxide or an alcoholic solution of freshly prepared silver oxide.

In the third step, the $\omega,\omega'$-dihydroxypolymer or its ester of a carboxylic acid having up to 6 carbon atoms such as acetic acid and propionic acid, is polymerized with a polyester-forming polycondensable monomer to give a block copolyester.

Such polycondensable monomers include: diols having from 2–10 carbon atoms such as ethylene glycol, trimethylene glycol, tetramethylene glycol, pentamethylene glycol, hexamethylene glycol, isobutylene glycol, polyethylene glycol, cyclohexane glycols, xylene glycols and their esters of carboxylic acids having up to 6 carbon atoms, such as acetic acid and propionic acid; dicarboxylic acids, having up to 15 carbon atoms such as succinic acid, glutaric acid, adipic acid, pimeric acid, suberic acid, azelaic acid, sebacic acid, phthalic acid, cyclohexane dicarboxylic acid, xylene dicarboxylic acids, and their esters of lower alcohols having up to 6 carbon atoms, such as methanol and ethanol, and of phenol, and their halides; hydroxycarboxylic acids having up to 15 carbon atoms such as glycolic acid, lactic acid, 5-hydroxypentanoic acid, 6-hydroxyhexanoic acid, 11-hydroxytetradecanoic acid, 11-hydroxyhexadecanoic acid, 14-hydroxyhexadecanoic acid, $\omega$-hydroxylauric acid, $\omega$-hydroxypalmitic acid, 22-hydroxydocosanoic acid, cyclohexanol monocarboxylic acids, $\omega$-hydroxyalkyl benzoic acids, etc., and their esters of lower alcohols having up to 6 carbon atoms such as methanol, ethanol and of phenol, esters of carboxylic acids having up to 6 carbon atoms, such as acetic acid and propionic acid, and their halides and bisphenols having up to 25 carbon atoms, such as hydroquinone, diphenylolpropane, etc.

Polymerization can be carried out by any of the following methods.

i. Direct polyesterification of the $\omega,\omega'$-dihydroxypolymer with the dicarboxylic acid in the presence or absence of the diol.

ii. Polyesterification by an ester interchange reaction of a diester of the dicarboxylic acid with a $\omega,\omega'$-dihydroxypolymer in the presence or absence of the diol.

iii. Polyesterification of the $\omega,\omega'$-dihydroxypolymer with a dihalide of the dicarboxylic acid in the presence or absence of the diol.

iv. Polyesterification of the $\omega,\omega'$-dihydroxypolymer with a dihalide of the dicarboxylic acid in the presence of a bisphenol.

v. Polyesterification of the $\omega,\omega'$-dihydroxypolymer with the hydroxycarboxylic acid in the presence of the dicarboxylic acid.

vi. Polyesterification of the $\omega,\omega'$-dihydroxypolymer with an alcohol ester of the hydroxycarboxylic acid in the presence of the dicarboxylic acid or its ester.

vii. Polyesterification of the $\omega,\omega'$-dihydroxypolymer with a carboxylic ester of the hydroxycarboxylic acid in the presence of the dicarboxylic acid or its ester.

viii. Polyesterification of the dicarboxylic ester of ω,ω'-dihydroxypolymer with the dicarboxylic acid in the presence or absence of the diol or its ester.

ix. Polyesterification of the dicarboxylic ester of ω,ω'-dihydroxypolymer with the hydroxycarboxylic acid in the presence of the dicarboxylic acid.

x. Polyesterification of the dicarboxylic ester of ω,ω'-dihydroxpolymer with an alcohol ester of the hydroxycarboxylic acid in the presence of the dicarboxylic acid.

The above polymerizations are carried out by known methods, preferably melt polymerization in an inert atmosphere. Usually every polymerization can be carried out during 2 to 30 hours. Polymerizations (i), (ii), (v), (vi), (vii), (viii), (ix) and (x) are done between 100°C and 300°C, and polymerizations (iii) and (iv) between 0°C and 200°C.

The novel block copolyesters have merits which are derived from the desirable properties of both polyesters and polymers of ethylenically unsaturated monomers. Block copolymers of aliphatic polyesters and polymer of ethylenically unsaturated monomers have higher melting points than those of aliphatic polyesters. Block copolymers of aromatic polyesters and polymers of ethylenically unsaturated monomers have lower melting points than those of polymers of ethylenically unsaturated monomers. Block copolymers are more elastic and plastic in nature and can be more easily molded and melt-case into films and shaped objects. Such copolymers are more resistant to acids and base than ordinary polyesters. Young's modulus, solvent resistance, and crystallinity of block copolymers of aromatic polyesters and polymers of ethylenically unsaturated monomers are higher than those of polymers of ethylenically unsaturated monomers.

Our invention is further illustrated by the following examples.

placed by nitrogen, and the mixture was reacted with stirring at 30°C for 72 hours. Thionyl chloride was removed by vacuum evaporation from the reaction mixture, and the remaining solid was filtered out. The filtrate, on adding a 10 times volume of the filtrate of water-methanol mixture (10:90 ratio), gave a precipitate, which was washed with 400 ml. of methanol to give powdery ω,ω'-dichloropolystyrene. Yield, 76.4%.; melting point, 66°–68.5°C; intrinsic viscosity, 0.0190 in benzene at 30°C; molecular weight calculated from intrinsic viscosity, 1,164; Cl content 5.48%; molecular weight calculated from chlorine content, 1,320.

A 40 g. quantity of powdery ω,ω'-dichloropolystyrene thus obtained was dissolved in 100 ml. of N,N-dimethylformamide in a three-necked flask equipped with a stirrer and two condensers leading to a nitrogen inlet and a nitrogen outlet. To the polymer solution stirred at 100°C under nitrogen atmosphere, was added 11.42 g. of an aqueous solution containing 5.71 g. of potassium hydroxide, and the mixture was stirred at 100°C for 12 hours. After the reaction, the contents in the flask were mixed with a 10 times volume of water to give colorless precipitate of ω,ω'-dihydroxypolystyrene. Yield, 75.4%; melting point, 105°–108°C; chlorine content, 0.00%.

In a polymer tube having a side arm and nitrogen capillary inlet reaching to the bottom of the tube, were placed a mixture of ω,ω'-dihydroxypolystyrene, ethylene glycol, dimethyl terephthalate, antimony trioxide and calcium acetate dihydrate in the quantities as listed in Table 1-1. A slow stream of nitrogen was passed through a melt of the mixture kept at 197°C during the course of 6 hours, and at 283°C during the course of 6 hours. Block copolymers of the properties as listed in Table 1-1 were obtained with various comonomer feeds.

In the Tables, $F_2$ represents the mole fraction of polystyrene units in the block copolymer.

TABLE 1-1

| Experiment Number | dimethyl terephthalate (g) | ethylene glycol(g) | ω,ω'-dihydroxy polystyrene(g) | antimony trioxide | calcium acetate(g) |
|---|---|---|---|---|---|
| 1-1 | 3.8851 | 2.4940 | 0.5208 | 0.0181 | 0.0062 |
| 1-2 | 2.9134 | 1.8536 | 1.0413 | 0.0123 | 0.0045 |
| 1-3 | 1.9423 | 1.2697 | 1.5624 | 0.0082 | 0.0031 |
| 1-4 | 0.9719 | 0.6207 | 2.0809 | 0.0043 | 0.0017 |

| Experiment Number | $F_2$ | Melting Point (°C) | Intrinsic Viscosity | Density (g/cm³) |
|---|---|---|---|---|
| 1-1 | 0.208 | 250–262 | 0.821 | 1.231 |
| 1-2 | 0.370 | 238–245 | 0.704 | 1.182 |
| 1-3 | 0.563 | 220–228 | 0.430 | 1.113 |
| 1-4 | 0.756 | 169–175 | 0.351 | 1.084 |

Example I

In a three-necked flask equipped with a stirrer and two condensers, each leading to a nitrogen inlet and a nitrogen outlet, were placed 208.2 g. (2 mole) of styrene, 6.75 g. of aluminium chloride and 46.6 ml. of thionyl chloride. The atmosphere inside the flask was re- In the polymer tube as described above, were placed ω-hydroxy-n-decanoic acid and ω,ω'-dihydroxypolystyrene and the mixture was melt-polymerized at 150°C in a nitrogen stream for 2 hours and at 240°C under 0.1 mmHg. an additional 6 hours. The results are shown in Table 1-2.

TABLE 1-2

| Experiment Number | ω-hydroxydecanoic acid (g) | ω,ω'-dihydroxy-polystyrene (g) | $F_2$ | Melting Point(°C) | Intrinsic Viscosity | Density (g/cm³) |
|---|---|---|---|---|---|---|
| 1-5 | 3.7654 | 0.5208 | 0.185 | 69–73 | 0.934 | 1.144 |
| 1-6 | 2.8241 | 1.0413 | 0.371 | 75–79 | 0.871 | 1.121 |
| 1-7 | 1.8827 | 1.5624 | 0.541 | 83–86 | 0.841 | 1.100 |
| 1-8 | 0.9414 | 2.0807 | 0.744 | 95–101 | 0.732 | 1.098 |

Example 2

A three-necked flask equipped with a stirrer, two condensers and a nitrogen inlet and outlet was filled with nitrogen. To the flask, 2 mole (239.7 g.) of α-methyl styrene, 240 ml. of methylene chloride and 46.6 ml. of thionyl chloride were added and the flask was kept at −50°C. After adding 6.75 g. of aluminum chloride, polymerization was carried out with agitation at −50°C for 12 hours. After the polymerization was complete, unreacted thionyl chloride was removed by vacuum evaporation and the solids were filtered off. An addition of a 10-fold volume of a water-methanol mixture containing 10% water gave a precipitate, which was washed sufficiently with 400 ml. of methanol and a powdery polymer was obtained. Yield: 70%; Softening point: 160°–170°C; Intrinsic viscosity: 0.098; Molecular weight calculated from viscosity: 2,260; chlorine analysis: 3.17%, Molecular weight calculated from halogen analysis: 2,240.

The powder (40 g.) thus obtained was placed in a three-necked flask equipped with a stirrer, two condensers and a nitrogen inlet and outlet and 100 ml. of N,N-dimethylformamide was added to make a homogeneous solution. The inside atmosphere of the flask was replaced with nitrogen and the flask was kept under agitation at 100°C. Then, 11.42 g. of an aqueous solution containing 5.71 g. of potassium hydroxide was added. The reaction was carried out with agitation at 100°C for 12 hours. After the reaction was complete, a colorless precipitate was obtained by adding a 10-fold volume of water.

Yield: 77.7%; Melting point: 162°–167°C; chlorine analysis: 0.00%.

In a glass polymerization tube, 3.8847–0.9718 g. of dimethyl terephthalate, 2.4934–0.6205 g. of ethylene glycol and 0.5993–2.3970 g. of ω,ω′-dihydroxypoly-α-methylstyrene were added and an ester exchange reaction and polymerization were carried out under nitrogen atmosphere at 197°C for 6 hours, at 283°C for 2 hours, and in vacuo of 0.1 mmHg. for 6 hours. The results are shown in Table 2-1.

In the glass polymerization tube described above, 3.7564–0.9414 g. of ω-hydroxyundecanoic acid and 0.5993–2.3970 g. of ω,ω′-dihydroxypoly-α-methylstyrene were added and the polymerization was carried out under a nitrogen atmosphere at 150°C for 2 hours and at 240°C in vacuo of 0.1 mmHg for 6 hours.

The results are shown in Table 2-2.

TABLE 2–2

| Experimental Number | 2 – 5 | 2 – 6 | 2 – 7 | 2 – 8 |
|---|---|---|---|---|
| ω-Hydroxyundecanoic acid (g) | 3.7654 | 2.8241 | 1.8827 | 0.9414 |
| ω,ω′-Dihydroxypoly-α-methylstyrene | 0.5993 | 1.1984 | 1.7976 | 2.3970 |
| $F_2$ | 0.177 | 0.341 | 0.521 | 0.711 |
| Melting point (°C) | 70–76 | 88–94 | 99–106 | 110–115 |
| Intrinsic viscosity | 0.921 | 0.811 | 0.754 | 0.591 |
| Density (g/cm³) | 1.154 | 1.132 | 1.100 | 1.091 |

We claim:

1. A block copolymer comprising a plurality of repeating units of the formula $$\left( O - \left( \begin{array}{c} R \ R'' \\ | \ | \\ C - C \\ | \ | \\ R' \ R''' \end{array} \right)_n OCOR_2CO \right)_p \left( O - Z - CO \right)_q$$

in which:

R, R′, R″ and R‴ are independently H or a member selected from the group consisting of alkyl radicals having up to 8 carbon atoms, aralkyl radicals having up to 10 carbon atoms, aryl radicals having up to 10 carbon atoms, alkoxy radicals having up to 8 carbon atoms;

R, R′, R″ and R‴ also collectively represent a 3–7 atom residue of a carbon ring structure which may contain up to two hetero oxygen atoms;

$R_2$ is a member selected from the group consisting of alkylene radicals having from 2–12 carbon atoms and arylene radicals having from 6–12 carbon atoms;

Z is a member selected from the group consisting of $-R_1OCOR_2-$ and $R_4$;

$R_1$ is an alkylene radical having from 2–12 carbon atoms;

$R_4$ is a member selected from the group consisting of alkylene radicals having from 5–16 carbon atoms and arylene radicals having from 6–12 carbon atoms;

n is an integer having a value of from 1 to 500; and p and q represent the relative molar ratio of each

TABLE 2–1

| Experiment Number | Dimethyl terephthalate (g) | Ethylene Glycol (g) | (II)* (g) | Antimony Trioxide | Calcium Acetate(g) |
|---|---|---|---|---|---|
| 2–1 | 3.8847 | 2.4934 | 0.5993 | 0.0184 | 0.0064 |
| 2–2 | 2.9137 | 1.8531 | 1.1985 | 0.0125 | 0.0047 |
| 2–3 | 1.9425 | 1.2698 | 1.7978 | 0.0084 | 0.0034 |
| 2–4 | 0.9718 | 0.6205 | 2.3970 | 0.0044 | 0.0016 |

| Experiment Number | $F_2$ | Melting Point (°C) | Intrinsic Viscosity | Density (g/cm³) |
|---|---|---|---|---|
| 2–1 | 0.194 | 247–251 | 0.815 | 1.224 |
| 2–2 | 0.379 | 224–230 | 0.682 | 1.227 |
| 2–3 | 0.600 | 214–219 | 0.441 | 1.171 |
| 2–4 | 0.720 | 202–207 | 0.364 | 1.099 |

*ω,ω′-dihydroxypoly-α-methylstyrene unit and are defined by the formula $(p/[p+q]) + (q/[p+q]) = 1$.

2. The polymer of claim 1 of the formula

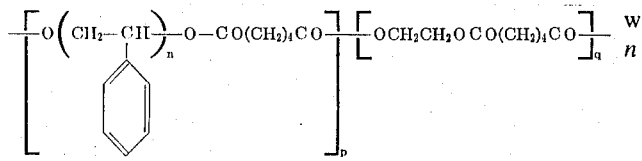

3. The polymer of claim 1 of the formula

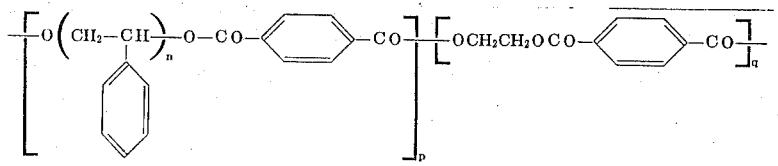

4. The polymer of claim 1 of the formula

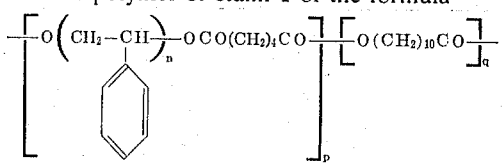

5. The polymer of claim 1 of the formula

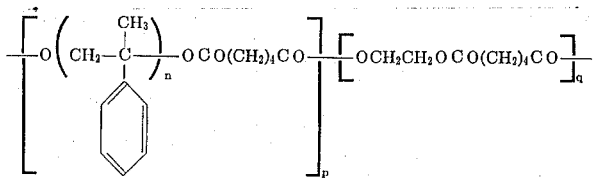

6. The polymer of claim 1 of the formula

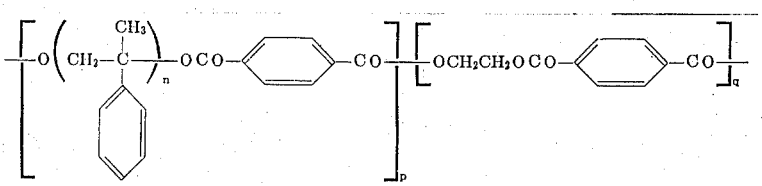

7. A method of making a block copolymer comprising:
a. polymerizing an ethylenically unsaturated monomer of the formula:

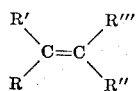

wherein R, R′, R″ and R‴ are independently H or a member selected from the group consisting of alkyl radicals having up to 8 carbon atoms, aralkyl radicals having up to 10 carbon atoms, aryl radicals having up to 10 carbon atoms, alkoxy radicals having up to 8 carbon atoms; R, R′, R″ and R‴ also collectively represent a 3–7 atom residue of a carbon ring structure which may contain up to two hetero oxygen atoms; in the presence of at least a stoichiometric quantity of molecular halogen or an acid polyhalide containing at least two halogen atoms per molecule, the molecular weight of the halogen, X, being at least 35.5 and a catalytic amount of a Lewis Acid to form a ω,ω′-dihalopolymer of the formula:

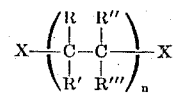

wherein R, R′, R″, R‴, and X are as defined aforesaid, n is an integer having a value of from 1 to 500;

b. subjecting said ω,ω′-dihalopolymer to hydrolysis to form a ω,ω′-dihydroxypolymer of the formula:

wherein R, R′, R″, R‴ and n are as defined aforesaid;

c. polymerizing said ω,ω′-dihydroxypolymer in the presence of at least one polyester-forming polycondensable monomer selected from the group consisting of diols having from 2–10 carbon atoms and their esters of carboxylic acids having up to 6 carbon atoms; dicarboxylic acids having up to 15 carbon atoms and their halides and esters of phenol and lower alcohols having up to 6 carbon atoms; hydroxycarboxylic acids having up to 15 carbon atoms and their halides and esters of carboxylic acids having up to 6 carbon atoms and esters of lower alcohols having up to 6 carbon atoms; and bisphenols having up to 25 carbon atoms; and d. recovering said block copolymer from the reaction mixture.

8. A method according to claim 7 wherein the polymerization step (c) is conducted at a temperature of 0°–200°C.

9. A method of making block copolyesters comprising a plurality of repeating units of the formula

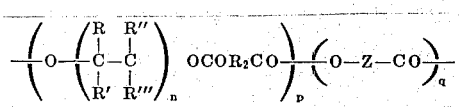

in which:
R, R′, R″ and R‴ are independently H or a member selected from the group consisting of alkyl radicals having up to 8 carbon atoms, aralkyl radicals having up to 10 carbon atoms, aryl radicals having up to 10 carbon atoms, alkoxy radicals having up to 8 carbon atoms;

R, R′, R″ and R‴ also collectively represent a 3–7 atom residue of a carbon ring structure which may contain up to two hetero oxygen atoms;

$R_2$ is a member selected from the group consisting of alkylene radicals having from 2–12 carbon atoms and arylene radicals having from 6–12 carbon atoms;

Z is a member selected from the group consisting of —R₁OCOR₂— and R₄;

R₁ is an alkylene radical having from 2–12 carbon atoms;

R₄ is a member selected from the group consisting of 2–16 carbon atoms and arylene radicals having from 6 to 12 carbon atoms;

n is an integer having a value of from 1 to 500; and p and q represent the relative molar ratio of each unit and are defined by the formula $(p/[p+q]) + (q/[p+q]) = 1$, said method comprising a. polymerizing an ethylenically unsaturated monomer of the formula:

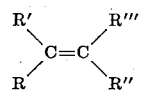

wherein R, R', R'' and R''' are as defined aforesaid in the presence of at least a stoichiometric quantity of molecular halogen or an acid polyhalide containing at least two halogen atoms per molecule, the molecular weight of the halogen, X, being at leaset 35.5 and a catalytic amount of a Lewis Acid to form a ω,ω'-dihalopolymer of the formula:

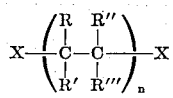

wherein R, R', R'', R''', X and n are as defined aforesaid;

b. subjecting said ω,ω'-dihalopolymer to hydrolysis to form a ω,ω'-dihydroxypolymer of the formula:

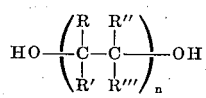

wherein R, R', R'', R''' and n are as defined aforesaid;

c. subjecting said ω,ω'-dihydroxypolymer to the reaction of the acid, halide or ester of a dicarboxylic acid of the formula HOCOR₂COOH, wherein R₂ is as defined aforesaid, and a member selected from the group consisting of HO—R₁—OH and R₃OCOR₄OH, wherein R₄ is as defined aforesaid, and R₃ is a member selected from the group consisting of hydrogen and lower alkyl;

d. polymerizing the resulting mixture; and e. recovering said block copolymer from the reaction mixture.

10. A method according to claim 8 wherein polymerization step (d) is a melt polymerization in an inert atmosphere at a temperature of 100°C – 300°C.

11. A method according to claim 9 wherein the hydrolysis of the ω,ω'-dihalopolymer is conducted in an aqueous solution of an alkali or alkaline earth metal hydroxide.

12. A method according to claim 9 wherein the ω,ω'-dihalopolymer is subjected to reaction with a metal acetate in acetic acid solution to from a ω,ω'-diacetoxy polymer which is then hydrolyzed to form the ω,ω'-dihydroxy polymer.

13. A method according to claim 9 wherein the halogenating agent is a member selected from the group consisting of thionyl chloride, phosgene, phosphorus pentachloride, phosphorus trichloride, phosphorus oxychloride, phosphorus tribromide, chlorine, bromine and iodine.

14. A method according to claim 13 wherein the ω,ω'-dihalopolymer is formed at a temperature of −100°C to 75°C.

15. A method according to claim 13 wherein the Lewis Acid is a member selected from the group consisting of beryllium dichloride, cadmium dichloride, zinc dichloride, boron trichloride, boron tribromide, aluminium trichloride, aluminium tribromide, gallium trichloride, titanium tetrachloride, titanium tetrabromide, zirconium tetrachloride, stannous chloride, stannic chloride, stannic bromide, antimony pentachloride, antimony trichloride, bismuth trichloride, ferric chloride, and vanadium tetrachloride.

16. A method according to claim 9 wherein the ethylenically unsaturated monomer is a member selected from the group consisting of ethylene, propylene, isobutylene, styrene, α-methyl styrene, nuclear substituted styrenes, nuclear substituted α-methyl styrenes, vinylmethyl ether, α,β-dimethoxyethylene, vinylphenyl ether, stilbene, vinyloctyl ether, and acenaphthylene.

* * * * *